(12) United States Patent
Jensen et al.

(10) Patent No.: US 6,380,329 B1
(45) Date of Patent: Apr. 30, 2002

(54) POLYMERIZATION CATALYSTS AND PROCESSES THEREFOR

(75) Inventors: Michael D. Jensen, Bartlesville; Kenneth R. Farmer, Dewey, both of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/474,402

(22) Filed: Dec. 29, 1999

(51) Int. Cl.⁷ .............................. C08F 4/16; C08F 4/14
(52) U.S. Cl. .................. 526/127; 526/133; 526/134; 526/161; 502/162
(58) Field of Search ................. 526/133, 134, 526/127, 160, 161, 443, 348.6; 502/155, 152, 162

(56) References Cited

U.S. PATENT DOCUMENTS

| | | | |
|---|---|---|---|
| 3,242,099 A | 3/1966 | Manyik et al. | 252/429 |
| 3,248,179 A | 4/1966 | Norwood | 23/285 |
| 4,808,561 A | 2/1989 | Welborn, Jr. | 502/104 |
| 5,547,675 A | 8/1996 | Canich | 502/117 |
| 5,919,983 A | 7/1999 | Rosen et al. | 568/3 |

OTHER PUBLICATIONS

Stahl et al., Monomeric, Four–Coordinate Group 4 Metal Complexes with Chelating Bis(tert–butylamindo)cyclodisilazane Ligands, Inorg, Chem. 1997, 36 4451–4457.*

Gibson et al., High Activity Ethylene Polymerization Catalysts Based on Chelating Diamide Ligands, Chem. Commun. 1998, 313–314.*

Grocholl et al., Inorg. Chem. 1997, 36, pp. 4451–4457.

Gibson et al., Chem. Commun., 1998, pp. 313–314.

Veith et al., Chem. Ber. 121, pp. 943–949 (1988).

* cited by examiner

*Primary Examiner*—Bernard Lipman
*Assistant Examiner*—R. Harlan
(74) *Attorney, Agent, or Firm*—Lynda S. Jolly; Edward L. Bowman

(57) ABSTRACT

A process is provided which comprises preparing heterogeneous or homogeneous catalyst systems comprising cyclodisilizane complexes of Group IV metals wherein said metal is selected from consisting of titanium, zirconium and hafnium; and a cocatalyst selected from the group consisting of methylaluminoxane and fluoro organic boron compounds and mixtures thereof. This invention also provides polymerization processes comprising contacting a mono-1-olefin, and optionally one or more higher alpha-olefins, in a reaction zone with cyclodisilizane complexes of Group IV metals catalyst systems and in the presence of a cocatalyst selected from the group consisting of aluminoxane, fluoro organic boron compounds, and mixtures thereof are provided.

27 Claims, No Drawings

POLYMERIZATION CATALYSTS AND PROCESSES THEREFOR

BACKGROUND OF THE INVENTION

This invention relates to homopolymerization of mono-1-olefin monomers, such as ethylene and propylene, and copolymerization of a mono-1-olefin monomers, such as ethylene and propylene, with at least one higher alpha-olefin comonomer.

It is known that mono-1-olefins such, as ethylene and propylene, can be polymerized with catalyst systems employing transition metals such as titanium, vanadium, and chromium. These metallocene catalyst systems represent a new class of catalyst systems which can offer important advantages, such as high activity, hydrogen control of molecular weight, and a narrow molecular weight distribution. Most importantly these catalyst systems can allow a polymer producer to tailor the catalyst system compound to produce special, desirable characteristics in a polymer.

However, not all such metallocene catalyst systems display high activity, and most are actually too sensitive to hydrogen. The present invention relates to a new class of single site compounds which usually are not classified as metallocenes, yet offer high activity, narrow polymer molecular weight distribution, and are not so extremely sensitive to hydrogen during a polymerization reaction as a molecular weight regulator.

SUMMARY OF THE INVENTION

It is an object of this invention to provide novel catalyst systems useful for polymerization.

It is another object of this invention to provide catalyst systems which have increased activity and increased productivity.

It is a further object of this invention to provide catalyst systems which have reduced cocatalyst consumption.

It is still another object of this invention to provide an improved polymerization process.

It is yet another object of this invention to provide homopolymers of mono-1-olefins and copolymers of at least two different mono-1-olefin(s) that can be processed easily, as indicated by a narrow molecular weight distribution.

In accordance with this invention, heterogeneous or homogeneous catalyst systems comprising cyclodisilizane complexes of Group IV metals wherein said metal is selected from consisting of titanium, zirconium and hafnium; wherein said cyclodisilizane ligands further comprise substituents selected from the group consisting of alkyl, aryl, heteroatom-alkyl/aryl; wherein the heteroatom is selected from the group consisting of oxygen, nitrogen, silicon, and mixtures thereof; and wherein said cyclodisilizane complexes of Group IV metal further comprise additional ligands selected from the group consisting of halides, pseudo halides, alkyls, aryls, and mixtures thereof, and a cocatalyst selected from the group consisting of methylaluminoxane and fluoro organic boron compounds and mixtures thereof. Processes to make these catalyst systems also are provided.

In accordance with another embodiment of this invention, polymerization processes comprising contacting a mono-1-olefin, and optionally one or more higher alpha-olefins, in a reaction zone with cyclodisilizane complexes of Group IV metals catalyst systems and in the presence of a cocatalyst selected from the group consisting of aluminoxane, fluoro organic boron compounds, and mixtures thereof are provided.

In accordance with yet another embodiment of this invention catalyst systems consisting essentially of cyclodisilizane complexes of Group IV metals wherein the metal is selected from the group consisting of titanium, zirconium and hafnium; wherein said cyclodisilizane ligands further comprise substituents selected from the group consisting of alkyl, aryl, heteroatom-alkyl/aryl; wherein the heteroatom is selected from the group consisting of oxygen, nitrogen, silicon, and mixtures thereof; and wherein said cyclodisilizane complexes of Group IV metal further comprise additional ligands selected from the group consisting of halides, pseudo halides, alkyls, aryls, and mixtures thereof; and a cocatalyst selected from the group consisting of methylaluminoxane and, fluoro organic boron compounds and mixtures thereof. Processes to make these catalyst systems also are provided.

In accordance with still another embodiment of this invention, polymerization processes consisting essentially of a mono-1-olefin, and optionally one or more higher alpha-olefins, in a reaction zone with cyclodisilizane complexes of Group IV metals catalyst systems and in the presence of a cocatalyst selected from the group consisting of aluminoxane, fluoro organic boron compounds, and mixtures thereof are provided.

In accordance with yet another embodiment of this invention, compositions comprising homopolymers of mono-1-olefins and copolymers of two or more mono-1-olefins which can be characterized as having a high molecular weight, a medium density and narrow molecular weight distribution, are provided.

In accordance with yet another embodiment of this invention, compositions comprising homopolymers of ethylene and copolymers of ethylene and one or more higher alpha-olefins which can be characterized as having high molecular weight, increased branching and a narrow molecular weight distribution, are provided.

DESCRIPTION OF THE PREFERRED EMBODIMENTS

Catalyst Systems

Catalyst systems of this invention can be characterized as disilizane complexes of Group IV metals comprising additional ligands selected from the group consisting of alkyls, aryls, heteroatoms-alkyl/aryl, wherein said heteroatom is selected from the group consisting of oxygen, nitrogen, silica, and mixtures thereof and wherein additional ligands attached to the Group IV metal are selected from the group consisting of halides, pseudo halides, alkyls, aryls, and mixtures thereof. Exemplary Group IV metals include, but are not limited to, titanium, zirconium, and hafnium.

Compounds useful in accordance with this invention have a generic formula of $(SiN_2RR'_2)_2X_2$. These compounds can also be represented by the general structural formula shown below in Compound I Compound I

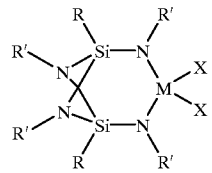

wherein R and R' can be the same or different and are selected from the group consisting of branched or linear alkyl or aromatic groups having from about 1 to about 10, preferably from about 1 to about 8, carbon atoms per alkyl group; heteroatoms/alkyl/aryl, wherein said heteroatom is selected from the group consisting of oxygen, nitrogen, silicon and mixtures thereof; and X is selected from the group consisting of halogens, pseudo halogens, alkyls and aryls having from about 1 to about 10, preferably from about 1 to about 8, carbon atoms per alkyl or aryl group. Most preferably R' is tertiary butyl, phenyl, or isopropyl; and wherein M is titanium, zirconium, or hafnium, preferably zirconium.

The cyclodisilizane complexes disclosed in this application can be prepared by any method known in the art. Typical syntheses of these complexes can be found in Grocholl, L., Huch, V., and Stahl, L., *Inorg. Chem.*, Vol. 36, pp. 4451–4457 (1997), herein incorporated by reference. Usually, for ease of catalyst system preparation, the cyclodisilizane ligand is prepared first. Catalyst system preparation procedures can vary, depending on substituents on the cyclodisilizane ligand.

To form an active catalyst system these compounds must be activated by combination with a cocatalyst. Suitable cocatalysts include aluminoxanes, fluoro organic boron compounds, and mixtures thereof. Aluminoxanes, also sometimes referred to as aluminoxy compounds, or poly (hydrocarbyl aluminum oxides), are well known in the art and generally are prepared by reacting a hydrocarbylaluminum compound with water. Such preparation techniques are disclosed in U.S. Pat. Nos. 3,242,099 and 4,808,561, the disclosures of which are incorporated herein by reference. The currently preferred aluminoxane cocatalysts are prepared either from trimethylaluminum or triethylaluminum and are sometimes referred to as poly(methyl aluminum oxide) and poly(ethyl aluminum oxide), respectively. It is also within the scope of the invention to use an aluminoxane in combination with a trialkylaluminum, as disclosed in U.S. Pat. No. 4,794,096, the disclosure of which is incorporated herein by reference.

When an aluminoxy cocatalyst is employed generally the molar ratio of the aluminum in the aluminoxy, also referred to as "organoaluminoxy", cocatalyst to the Group IV metal in the cyclodisilizane complex usually is with a range of about 1:1 to about 100,000:1 and more preferably within a range of about 5:1 to about 15,000:1.

The amount of methylaluminoxane (MAO) cocatalyst useful in the present invention is any amount sufficient to result in an active catalyst system. Generally, the amount of cocatalyst added to the reactor is an amount within a range of about 0.01 mg/L to about 1000 mg/L, preferably about 0.1 mg/L to about 100 mg/L. Most preferably, the amount of methylaluminoxane cocatalyst added is an amount within a range of 1 to 50 mg/L in order to maximize catalyst system productivity and activity. The amount of fluoro organic borate compound needed to achieve maximum activity is generally within a range of from about 0.5 moles per of organometallic catalyst compound, to about 10 moles per mole. Preferably about 0.8 to about 5 moles of fluoro organic borate compound per mole of organometallic catalyst compound is used.

Optionally, fluoro organic borate compounds can be used in order to activate and form catalyst system compositions. Examples of such fluoro organic borate compounds include, but are not limited to, fluorinated aryl borates, such as, N,N-dimethylanilinium tetrakis(pentafluorophenyl)borate, triphenylcarbenium tetrakis(pentafluorophenyl)borate, lithium tetrakis(pentafluorophenyl)borate, tris(pentafluorophenyl)boron, N,N-dimethylanilinium tetrakis[3,5-bis(trifluoromethyl)phenyl]borate, triphenylcarbenium tetrakis[3,5-bis(trifluoromethyl)phenyl]borate, and mixtures thereof. The above examples and related fluoro organic borates are thought to form "weakly-coordinating" anions when combined with metallocene catalysts as disclosed in U.S. Pat. No. 5,919,983, the disclosure of which is herein incorporated by reference.

These cocatalysts can be used either supported or unsupported. If supported, generally the support is an inorganic oxide such as a silica or an aluminate or combinations thereof. Obviously, the use of a supported cocatalyst results in a heterogeneous catalyst system and an unsupported cocatalyst can result in a homogeneous catalyst system. As used in this disclosure, the term "support" refers to a carrier for another catalytic component. However, by no means, is a support necessarily an inert material; it is possible that a support can contribute to catalytic activity and selectivity.

One exemplary procedure to make an active catalyst system comprises contacting the cocatalyst with a dicyclosilizane complex Group IV metal at any temperature and time sufficient to form an active catalyst system. Generally, temperatures of about room temperature are acceptable and contact times of less than about 24 hours can be used.

Another method for forming an active catalyst system comprises treating a dicyclocyosilizane complex Group IV metal with an alkylating agent to make a dialkyl complex. Exemplary alkylating agents includes, but are not limited to, methyl lithium, benzyl magnesium chloride, and mixtures thereof. Upon formation of a dialkyl complex, the dialkyl complex then is treated with a neutral borane compound such as trisperfluoroaryl borane in order to produce an active catalyst system.

Reactants, Polymerization and Polymer Products

Polymers produced according to the process of this invention can be homopolymers of mono-1-olefins or copolymers of at least two different mono-1-olefins. Exemplary mono-1-olefins useful in the practice of this invention include, but are not limited to mono-1-olefins having from about 2 to about 10 carbon atoms per molecule. Preferred mono-1-olefins include, but are not limited to ethylene, propylene, 1-butene, 1-pentene, 1-hexene, 1-heptene, 3-methyl-1-butene, 4-methyl-1-pentene, 1-octene, 1-nonene and 1-decene. If the reaction product is a copolymer, one mono-1-olefin monomer can be polymerized with a mono-1-olefin comonomer which is a different alpha-olefin, usually having from about 3 to about 10, preferably from 3 to 8 carbon atoms per molecule. Exemplary comonomers include, but are not limited to, propylene, 1-butene, butadiene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butadiene in order to achieve maximum polymer product toughness and clarity.

If a comonomer is used, the comonomer can be added to the polymerization reactor, or reaction zone, in an amount within a range of about 1 to about 20 weight percent, preferably within 7 to about 18 weight percent, based on the weight of the ethylene monomer. Most preferably, a comonomer is present in the reaction zone within a range of 10 to 16 weight percent, in order to produce a polymer having the most desired physical properties.

Polymerization of the monomer and optional comonomer can be carried out using any polymerization process known in the art. Exemplary polymerization processes include, but are not limited to, solution processes, loop/slurry, and gas phase processes. Generally, if a solution process is used, a homogeneous catalyst system is preferred; if a loop/slurry or gas phase process is used, heterogeneous catalyst systems are preferred.

Two preferred polymerization methods for the slurry process are those employing a loop reactor of the type disclosed in Norwood, U.S. Pat. No. 3,248,179, herein incorporated by reference, and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after a reactor utilizing a catalyst system of this invention.

Most preferably, polymerization reactions are carried out in a loop/slurry or particle form, polymerization process. Under polymerization reaction conditions wherein the polymerization reaction temperature is kept below the temperature at which the polymer swells significantly. Slurry polymerization processes are much easier to operate and maintain than other polymerization process. A polymer product produced by a slurry process can be recovered much more easily. Such polymerization techniques are well known in the art and are disclosed, for instance, in Norwood.

A slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept within a range of about −20° C. to about 300° C. and preferably within a range of about 20 ° C. to about 120° C. Most preferably, the reaction zone temperature is within a range of 60° C. to 90° C. for best catalyst activity and productivity. Reaction temperatures below about −20° C. and above 300° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system can be kept in suspension and can be contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

Catalyst system precursor and cocatalyst can be added to the reactor in any order to effect polymerization. For example, catalyst system can be added, then some reactor diluent, such as isobutane, followed by MAO, then more diluent and finally, monomer and optional comonomer. However, as stated earlier, this addition order can be varied, depending on equipment availability and/or desired polymer product properties. Preferably, the catalyst system and MAO are not precontacted prior to addition to the polymerization reactor due to a possible decrease in catalyst system activity.

Polymers produced in accordance with this invention generally have a narrow molecular weight distribution, having a high load melt index to melt index (HLMI/MI) ratio of less than 100, preferably less than 50, and most preferably less than 30.

If desired, optional addition of one or more comonomers can be added to the polymerization reactor. The affirmatively added comonomers can further increase the amount of short chain branching in the resultant polymer, or copolymer. Polymers produced with the addition of a comonomer can have a greater number of short chain branches in addition to those generated as described above. If a comonomer is affirmatively added to the polymerization reactor, these polymers usually can comprise up to about 3500, and generally from about 20 to about 500, short chain branches per 10,000 backbone carbon atoms of polymer.

A further understanding of the invention and its advantages is provided by the following examples.

EXAMPLES

The following Runs are examples using cyclodisilizane zirconium dichloride catalyst systems.

Polymerization procedure: All polymerizations were carried out in a one gallon stirred Autoclave Engineers reactor. The reactor (autoclave) was first prepared for use by purging with nitrogen and heating the empty reactor to 120° C. After cooling to below 40° C. and purging with isobutane vapors, a small amount of cyclodisilizane zirconium dichloride (CDS), usually from 0.001 to 0.01 grams as indicated, was charged to the reactor under nitrogen. Then the cocatalyst, usually MAO solution, was added, and the reactor was closed. Next 1-hexene, if used, was injected into the reactor, followed by two liters of isobutane liquid added under pressure. The reactor was subsequently heated to the desired temperature, usually between 60° C. and 90° C., as indicated. The slurry was stirred at 700 rpm. In some runs, while heating, hydrogen was added to the reactor from one of two auxiliary vessels of 55 cc (SV) or 325 cc (LV) volume. The amount of hydrogen added was measured and expressed by the pressure drop on this vessel as its contents were added the reactor. The final partial pressure of hydrogen on the reactor itself can be determined approximately by multiplying the measured pressure drop from these auxiliary vessels by 0.163 (LV) or by 0.028 (SV). Ethylene then was added to the reactor and fed on demand to maintain a fixed total reactor pressure of usually between 200 and 400 psig, as indicated. The reactor was maintained at the specified temperature for about 60 minutes. Then the isobutane and ethylene were vented from the reactor, which was opened, and polymer was collected usually as a dry powder. In some cases the polymer stuck to the reactor walls and had to be scraped off for recovery.

Polymer Analyses: Melt Index (MI) in grams of polymer per ten minutes was determined in accordance with ASTM D1238, condition 190/2, at 190° C. with a 2,160 gram weight. High load melt index (HLMI) in grams of polymer per ten minutes was determined in accordance with ASTM D1238, Condition 190/2.16, at 190° C. with a 21,600 gram weight.

Reagents: The cyclodisilizane zirconium dichloride was prepared according to the procedure specified in L. Grocholl, V. Huch, and L Stahl, Inorganic Chemistry, Vol. 36, PP. 4451–4457. Methylaluminoxane (MAO) was obtained from Albemarle Corporation as a 10 wt % solution in toluene. Other aluminum alkyl cocatalysts were obtained from Akzo Corporation as one molar solutions in heptane. Ethylene was polymerization grade ethylene obtained from Union Carbide Corporation. This ethylene was then further purified through a column of ¼ inch beads of Alcoa A201 alumina, activated at 250° C. in nitrogen. Isobutane was polymerization grade obtained from Phillips Petroleum Co., Borger, Tex. It was further purified by distillation and it was passed through a column of ¼ inch beads of Alcoa A201 alumina, activated at 250° C. in nitrogen. 1-Hexene was polymerization grade obtained from Chevron Chemicals. It was further purified by nitrogen purging and storage over 13× molecular sieve activated at 250° C.

Examples 1–35

The following examples demonstrate the use of cyclodisilizane zirconium dichloride (CDS) with methylaluminoxane as a catalyst system for the polymerization of ethylene. The details of each polymerization run, and the results obtained, are listed in Table 1. In these Runs, the cyclodisilizane zirconium dichloride first was charged to the cold reactor as a dry powder, the exact amounts are shown in Table 1. Then, from 2 to 30 mL of 10% methylaluminoxane solution was injected, as shown in Table 1. Two liters of isobutane were added, followed in some Runs with hydrogen gas. The exact amount of hydrogen added is shown as the drop in pressure from an auxiliary vessel as described above (SV or LV). 1-Hexene, if used, was then added and the reactor was heated to the desired temperature, as shown in Table 1, followed by ethylene addition to reach the desired pressure which also is shown in Table 1. The reaction mixture was stirred and ethylene continuously added to maintain the specified pressure for about one hour. Afterwards the reactor was depressurized by venting, the reactor opened, and dry polymer powder was recovered and weighed. Catalyst system activity was calculated as grams of polymer produced per gram of cyclodisilizane zirconium dichloride per hour (gPE/gCDS/hr).

Table 1 shows the activity obtained at different ethylene pressures, hexene concentrations, and cocatalyst levels. Under the right conditions, some very high activities were obtained from this system, often above 100,000 gPE/gCDS/h. Hydrogen was added to control molecular weight. Its affect can be seen in the measured melt index values obtained. In general, cyclodisilizane zirconium dichloride yielded extremely high molecular weight polymers, as indicated by melt index and high load melt index values of zero. However, when hydrogen was added, melt index values in the useable range (around 1.0 g/10 mins) also could be obtained. 1-Hexene was added to impart branching to the polymer. The catalyst was not poisoned by the addition of 1-hexene. The molecular weight breadth of these polymers were often quite narrow as indicated by an HLMI/MI ratio below 20.

TABLE 1

CDSZrCl$_2$ with MAO

| Run No. | Grams CDS Charged | MAO mL @ 10 % | Pressure (psi) | Temp. (deg C.) | Time (min) | Grams PE Formed | Activity (gPE/gCDs/h) | H$_2$ psig | Hexene Added | Melt Index | HLMI | HLMI/ MI |
|---|---|---|---|---|---|---|---|---|---|---|---|---|
| 1  | 0.0031 | 3.1 | 180 | 50 | 60 | 194.31 | 62681  | 0      | 0     | 0     | 0     |      |
| 2  | 0.0063 | 2   | 300 | 60 | 60 | 138.7  | 22016  | 0      | 0     | 0     | 0.006 |      |
| 3  | 0.0059 | 2   | 300 | 60 | 60 | 166.79 | 28269  | 0      | 30 g  | 0     | 0.003 |      |
| 4  | 0.0058 | 5.8 | 228 | 60 | 60 | 195.3  | 33672  | 0      | 0     | 0     | 0     |      |
| 5  | 0.0059 | 2   | 340 | 70 | 60 | 86.05  | 14585  | 0      | 0     | 0     | 0.009 |      |
| 6  | 0.0047 | 4.7 | 261 | 70 | 60 | 88.51  | 18832  | 0      | 0     | 0     | 0.66  |      |
| 7  | 0.0056 | 2   | 380 | 80 | 60 | 37.63  | 6720   | 0      | 0     |       |       |      |
| 8  | 0.0058 | 5.3 | 290 | 80 | 60 | 29.86  | 5148   | 0      | 0     | 0.16  | 7.2   | 45.0 |
| 9  | 0.0063 | 6.3 | 287 | 80 | 60 | 34.37  | 5456   | 0      | 0     |       |       |      |
| 10 | 0.0093 | 2   | 300 | 60 | 60 | 222.36 | 23910  | 10 SV  | 0     | 0     | 0     |      |
| 11 | 0.0063 | 2   | 300 | 60 | 60 | 41.8   | 6635   | 100 LV | 100 g | 1.71  | 29.2  | 17.1 |
| 12 | 0.0036 | 2   | 300 | 60 | 60 | 85.5   | 23750  | 100 LV | 300 g | 1.13  | 19.86 | 17.6 |
| 13 | 0.0055 | 5   | 330 | 60 | 60 | 108.4  | 19709  | 100 LV | 0     | 0.23  | 2.62  | 11.4 |
| 14 | 0.0046 | 5   | 192 | 60 | 60 | 1.2    | 261    | 100 LV | 279 g |       |       |      |
| 15 | 0.0063 | 10  | 330 | 60 | 60 | 333.47 | 52932  | 100 LV | 0     | 2.97  | 31.13 | 10.5 |
| 16 | 0.0024 | 20  | 330 | 60 | 60 | 262.95 | 109563 | 100 LV | 0     | 4.91  | 97.4  | 19.8 |
| 17 | 0.0046 | 13  | 330 | 60 | 60 | 301.22 | 65483  | 100 LV | 0     | 3.82  | 71.4  | 18.7 |
| 18 | 0.0016 | 30  | 330 | 60 | 60 | 209.2  | 130750 | 100 LV | 0     | 3.2   | 96.3  | 30.1 |
| 19 | 0.0015 | 7   | 330 | 60 | 60 | 183.2  | 122133 | 100 LV | 0     | 0.88  | 9.35  | 10.6 |
| 20 | 0.0020 | 5   | 330 | 60 | 60 | 114    | 57000  | 100 LV | 0     |       |       |      |
| 21 | 0.0013 | 20  | 330 | 60 | 60 | 72.06  | 55431  | 100 LV | 0     |       |       |      |
| 22 | 0.0020 | 5   | 360 | 70 | 60 | 25.7   | 12850  | 100 LV | 0     | 11.64 | 193   | 16.6 |
| 23 | 0.0020 | 5   | 402 | 80 | 60 | 25.9   | 12950  | 100 LV | 0     |       |       |      |
| 24 | 0.0085 | 2   | 300 | 60 | 60 | 101.2  | 11906  | 100 SV | 0     | 1.2   | 23.7  | 19.8 |
| 25 | 0.0049 | 2   | 300 | 60 | 60 | 123.3  | 25163  | 100 SV | 200 g | 1.11  | 20.8  | 18.7 |
| 26 | 0.0044 | 2   | 300 | 60 | 60 | 127.58 | 28995  | 20 SV  | 30 g  | 0     | 0.008 |      |
| 27 | 0.0077 | 2   | 300 | 60 | 60 | 49.16  | 6384   | 30 SV  | 0     | 0     | 0.16  |      |
| 28 | 0.0041 | 2   | 300 | 60 | 60 | 183.9  | 44854  | 300 SV | 0     | 0     | 0.007 |      |
| 29 | 0.0051 | 2   | 300 | 60 | 60 | 113.76 | 22306  | 50 LV  | 100 g | 0.03  | 1.72  | 57.3 |
| 30 | 0.0046 | 4.6 | 171 | 60 | 60 | 142.1  | 30891  | 0      | 0     | 0     | 0.16  |      |
| 31 | 0.0051 | 5.1 | 323 | 60 | 60 | 257.8  | 50549  | 0      | 0     | 0     | 0     |      |
| 32 | 0.0038 | 3.8 | 153 | 60 | 60 | 57.1   | 15026  | 0      | 0     | 0     | 0     |      |
| 33 | 0.0018 | 30  | 230 | 60 | 5  | 112.43 | 749533 | 0      | 0     |       |       |      |
| 34 | 0.0028 | 30  | 420 | 60 | 60 | 304.2  | 108643 | 0      | 0     | 0     | 0.41  |      |
| 35 | 0.0030 | 30  | 518 | 60 | 60 | 379.4  | 126467 | 100 LV | 0     | 0.99  | 23.5  | 23.7 |

Examples 36–38

These examples demonstrate the use of cyclodisilizane zirconium dichloride with other aluminum alkyls instead of MAO as cocatalysts for the polymerization of ethylene. The details of these polymerization tests, and the results obtained, are listed in Table 2. In Table 2, "TEA" refers to triethyl aluminum, "DEAC" to diethyl aluminum chloride, and "DiBAL-H" to diisobutyl aluminum hydride. Otherwise, these Runs were conducted as in Runs 1–35, with MAO as cocatalyst. Pressures and temperatures are indicated in Table 2. In these Runs, cyclodisilizane zirconium dichloride with aluminum alkyl cocatalysts other than MAO produced no polymer.

TABLE 2

CDSZrCl$_2$ with Other Cocatalysts

| Run No. | Grams CDS Charged | Cocatalyst Type | Cocatalyst Amount | Pressure (psi) | Temp. deg C. | Time (min) | Grams PE Formed | Activity gPE/gCDS/h | H$_2$ psig | Hexene Added |
|---|---|---|---|---|---|---|---|---|---|---|
| 36 | 0.0064 | TEA | 2 mmol | 300 | 60 | 60 | 0 | 0 | 100 lv | 100 g |
| 37 | 0.0043 | DEAC | 2 mmol | 320 | 60 | 60 | 0 | 0 | 50 sv | |
| 38 | 0.0017 | DiBAL-H | 0.1 mmol | 308 | 70 | 60 | 0 | 0 | 0 | 0 |

While this invention has been described in detail for the purpose of illustration, it is not to be construed as limited thereby but is intended to cover all changes and modifications within the spirit and scope thereof.

That which is claimed:

1. A polymerization process comprising contacting in a reaction zone under polymerization reaction conditions:
   a) an olefin monomer and
   b) a catalyst system comprising cyclodisilizane complexes of Group IV metals
      wherein said metal is selected from the group consisting of titanium, zirconium and hafnium;
      wherein said cyclodisilizane ligands further comprise substituents selected from the group consisting of alkyl, aryl, heteroalkyls and heteroaryls wherein the heteroatom of said heteroalkyls and heteroaryls is selected from the group consisting of oxygen, nitrogen, and silicon; and
      wherein said cyclodisilizane complexes of Group IV metal further comprise additional ligands selected from the group consisting of halides, pseudo halides, alkyls, and aryls; and
   c) a cocatalyst selected from the group consisting of aluminoxanes, fluoro organic boron compounds and mixtures thereof; and
      wherein a polymer is recovered.

2. A process according to claim 1 further comprising contacting a comonomer selected from the group consisting of alpha-olefins having from 3 to 10 carbon atoms per molecule with (a), (b) and (c).

3. A process according to claim 2 wherein said monomer is selected from the group consisting of ethylene, propylene, and mixtures thereof.

4. A process according to claim 3 wherein said monomer is ethylene.

5. A process according to claim 2 wherein said comonomer is selected from the group consisting of propylene, 1-butene, 1-pentene, 1-hexene, 1-octene, 4-methyl-1-pentene, and mixtures thereof.

6. A process according to claim 5 wherein said comonomer is selected from the group consisting of 1-hexene, 4-methyl-1-pentene, and mixtures thereof.

7. A process according to claim 1 wherein said cyclodisilizane complexes of Group IV metals is represented by a formula

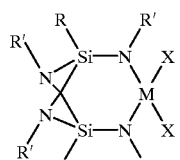

wherein R and R' can be the same or different and are selected from the group consisting of branched alkyls or linear alkyls, aromatic groups having from about 1 to about 10 carbon atoms, and heteroalkyls and heteroaryls wherein the heteroatom of said heteroalkyls and heteroaryls is selected from the group consisting of oxygen, nitrogen, and silicon and X is selected from the group consisting of halogens, pseudo halides, and alkyls and aryls having from about 1 to about 10 carbon atoms; and wherein M is titanium, zirconium, or hafnium.

8. A process according to claim 7 wherein said R and R' substituent is selected from the group consisting of branched alkyls, linear alkyl and aromatic groups having from about 1 to about 8 carbon atoms per group.

9. A process according to claim 8 wherein said R' substituent is selected from the group consisting of tertiary butyl, phenyl, and isopropyl groups.

10. A process according to claim 7 wherein said R and R' substituent is a heteroalkyl or heteroaryl in which the heteroatom is selected from the group consisting of oxygen, nitrogen, and silicon.

11. A process according to claim 7 wherein said X is selected from the group consisting of halogens, alkyls and aryls having from about 1 to about 10 carbon atoms.

12. A process according to claim 11 wherein said X is selected from the group consisting of halogens, alkyls and aryls having from about 1 to about 6 carbon atoms.

13. A process according to claim 7 wherein said M is zirconium.

14. A process according to claim 1 wherein said cocatalyst is an aluminoxane.

15. A process according to claim 14 wherein the molar ratio of aluminum to Group IV metal to is within a range of about 1:1 to about 100,000:1.

16. A process according to claim 14 wherein the molar ratio of aluminum to Group IV metal to is within a range of about 5:1 to about 15,000:1.

17. A process according to claim 1 wherein said cocatalyst is a fluoro organic boron compound.

18. A process according to claim 17 wherein said fluoro organic boron compound cocatalyst is added to a polymerization reactor in an amount within a range of about 0.5 to about 10 moles of fluoro organic boron compound per mole of organometallic catalyst system.

19. A process according to claim 1 wherein said polymerization is carried out under slurry polymerization conditions at a temperature within a range of about −20° to about 300° C. and a pressure within a range of about 100 to about 1000 psia.

20. A process according to claim 19 wherein said slurry polymerization reactor conditions comprise a diluent of isobutane.

21. A process according to claim 1 wherein a polyolefin is produced using cyclodisilizane zirconium dichloride.

22. A process according to claim 21 wherein methylaluminoxane is employed as cocatalyst.

23. A process according to claim 7 wherein each R' is the same or different and is selected from tertiary butyl, phenyl, and isopropyl.

24. A process according to claim 23 wherein each R is methyl.

25. A process according to claim 24 wherein each R' is tertiary butyl.

26. A process according to claim 23 wherein each R' is tertiary butyl and each R is phenyl.

27. A process according to claim 7 wherein each R and each R' is phenyl.

* * * * *